L. J. CARON.
SURFACE GAGE.
APPLICATION FILED MAY 14, 1915.
1,206,668.
Patented Nov. 28, 1916.
2 SHEETS—SHEET 1.
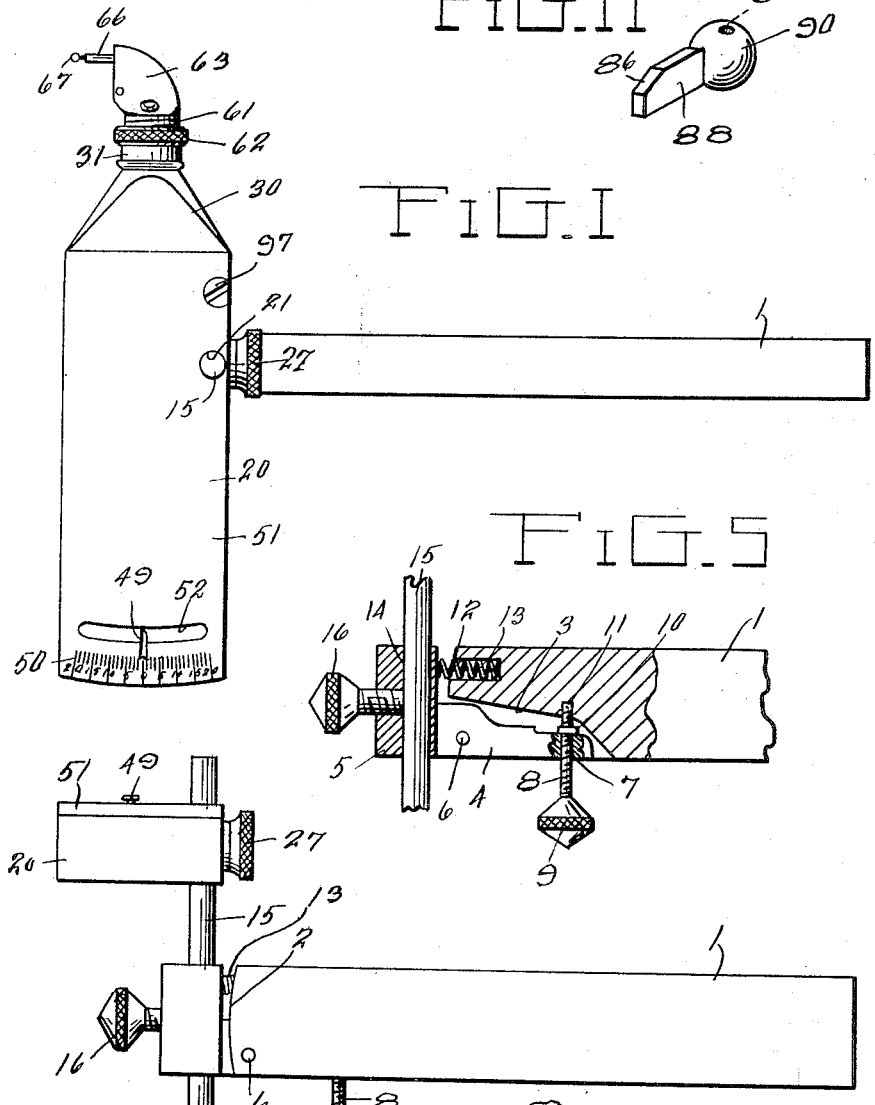

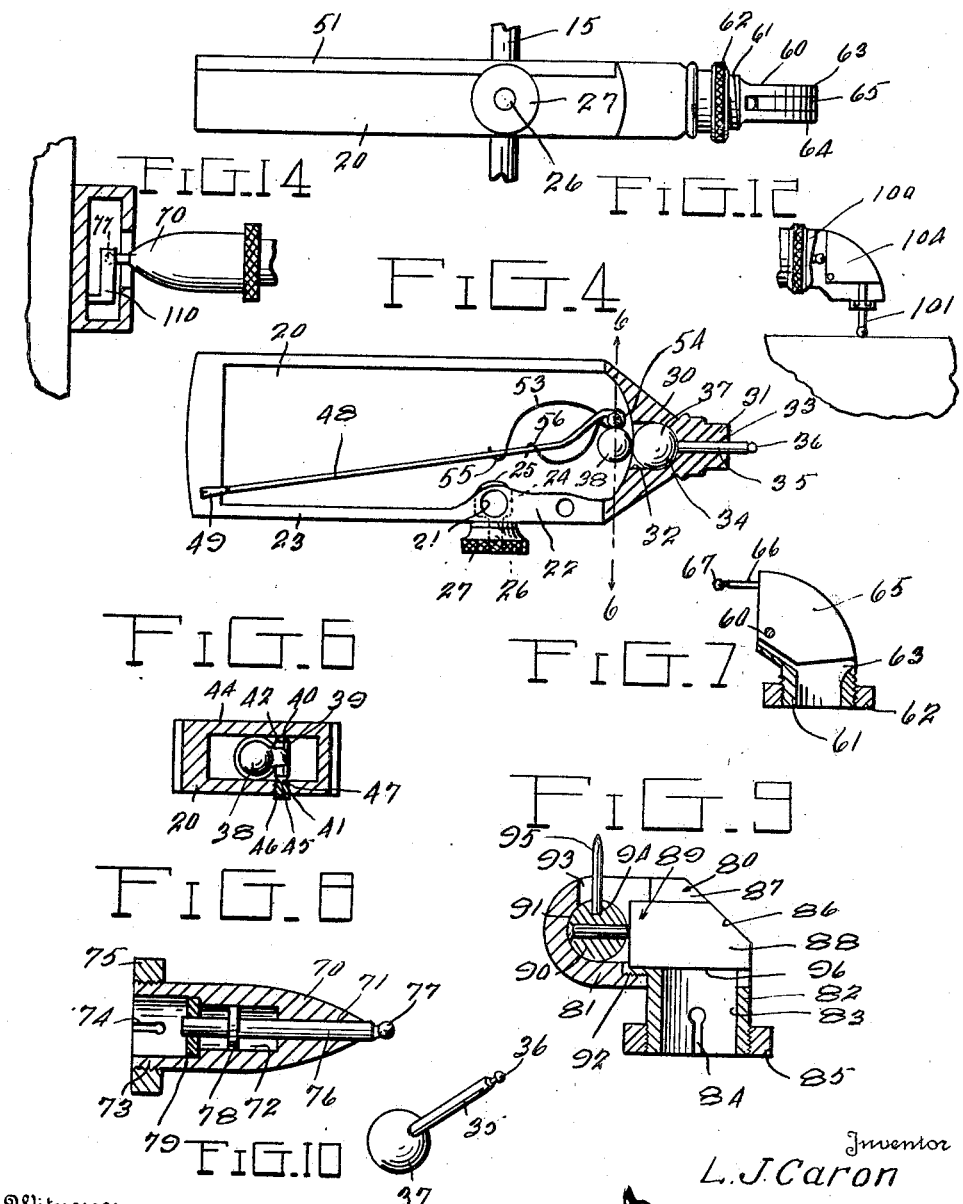

UNITED STATES PATENT OFFICE.

LUDGER J. CARON, OF LEOMINSTER, MASSACHUSETTS.

SURFACE-GAGE.

1,206,668.   Specification of Letters Patent.   Patented Nov. 28, 1916.

Application filed May 14, 1915. Serial No. 28,110.

*To all whom it may concern:*

Be it known that I, LUDGER J. CARON, a citizen of the United States, residing at Leominster, in the county of Worcester and State of Massachusetts, have invented certain new and useful Improvements in Surface-Gages; and I do hereby declare the following to be a full, clear, and exact description of the invention, such as will enable others skilled in the art to which it appertains to make and use the same.

This invention relates to gages designed for testing various classes of work, and it has for its primary object the production of a comparatively simple inexpensive gage, wherein variations in the thickness of work, unevenness in the finished surface, and other like inaccuracies in work may be accurately and positively detected or indicated, and further to provide an indicating needle which will actively respond to any variations in work surfaces, and indicate such variations upon a graduated scale.

Another object of this invention is to provide a gage as specified in which all the contacting surfaces, which are operated by the inaccuracies in working surfaces, are spherical in shape, to render the device susceptible to action upon minute surface variations.

Another object of this invention is to provide a tool as specified which may be easily and quickly attached to a lathe or other analogous machine post for use engaging work carried by the machine, and which includes means for adjusting the angle of the surface engaging and indicating portion of the surface gage.

A still further object of this invention is to provide a gage which has a plurality of interchangeable work engaging tips or nipples adapted for use in various kinds of work.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a plan view of the improved gage, Fig. 2 is a side elevation of the gage, Fig. 3 is an edge view of the indicating section of the gage, Fig. 4 is a section through the indicating section of the gage, Fig. 5 is a fragmentary section of the supporting section of the gage, Fig. 6 is a cross section on the line 6—6 of Fig. 4, Fig. 7 is a section of one of the surface engaging tips, showing the same partially in section, Fig. 8 is a section through another of the surface engaging tips, Fig. 9 is a section through still another form of the surface engaging tips, Fig. 10 is a detail perspective view of the indicating finger operating rod, Fig. 11 is a perspective view of a part of one of the nipples used in the construction of the gage, Fig. 12 is a fragmentary view of the gage, showing the same used as a surface gage for determining irregularities in the surface of a piece of work, Fig. 13 is a view showing a modified form of the head of the gage, used for gaging the walls of an opening of the recesses, and Fig. 14 is a view of still another modified form of a head, which is adaptable for the gaging of the inner wall of a recess which has a constricted mouth or opening.

Referring more particularly to the drawings, 1 designates the supporting bar of the test indicator, which is adaptable for attachment to a lathe post, being substantially rectangularly shaped in cross section and of a size similar to the size of ordinary tool holders. The supporting bar 1 has its forward end rounded or arcuate, as is shown at 2, and provided with a recess 3 as illustrated in Fig. 5 extending inwardly from the arcuate end and communicating with one edge of the bar. The recess 3 has a shank 4 of a head 5 mounted therein and pivotally supported by a pin 6 which extends transversely through the bar. The shank 4 of the head 5 is provided with an internally screw threaded opening 7 formed in its inner end, in which the externally screw threaded shank 8 of a thumb screw 9 is adjustably seated. The inner end of the shank 8 rests against the head 10 of a set screw 11, which is carried by the bar 1 and positioned within the recess 3, as is clearly shown in Fig. 5 of the drawings. The bar 1 is provided with a longitudinally extending recess 12, in which is seated a spiral spring 13. The spiral spring 13 projects out of the recess 12 and engages the rear edge of the head 5 upwardly of the shank 4, forming a cushion for the movement of the head and normally holding the head in vertical position, which position, and the upward movement of the head is limited by the inner end of the shank 4 engaging the head 10 of the set screw 11.

The head 5 is provided with a vertically extending bore 14, which bore is provided for receiving a bar 15. The bar 15 is held in various adjusted positions within the bore 14 by means of a set screw 16 which extends transversely into the head 5 from the outer end thereof.

The rod 15 is provided for insertion through the indicator carrying casing 20, which casing is provided with an opening 21 formed in the enlargement 22 as illustrated in Fig. 4 formed on the inner surface of one of the edge walls of the casing 20. The enlargement 22 and the edge wall 23, upon which the enlargement is formed, are provided with a socket 24 in which the head 25 of a tightening screw 26 is seated. The head 25 is provided with an opening which is adapted for alinement with the opening 21. The shank of the tightening screw 26 projects out of the edge of the casing 20 and has a thumb nut 27 mounted thereon, for drawing the head 25 outwardly for securely clamping the rod 15 within the opening 21 for holding the casing 20 in various adjusted positions upon the rod with respect to the bar 1.

The forward end 30 of the casing 20 tapers and has a sleeve 31 formed upon its outer end or apex. The tapered head 30 is solid and has a recess 32 as illustrated in Fig. 4 formed therein, the outer wall of which is substantially semi-spherical in shape and communicates with the bore 33 of the sleeve 31. The indicator finger operating member 34 is mounted in the recess 32 and the bore 33 and comprises a pin 35 which has a miniature ball 36 mounted upon its outer end and an enlarged ball 37 mounted upon its inner end and positioned within the recess 32. The ball 37 rests against the surface of a ball 38 which is secured to one side of the pin 39, as illustrated in Fig. 6, in any suitable manner, such as by soldering or an analogous manner. The pin 39 has conical bearing ends 40 and 41, and it is positioned within the casing 20 transversely to the pin 35. The conical bearing end 40 is seated in a conical bearing seat 42 formed in the upper side 44 of the casing 20, and the conical bearing end 41 is seated in a conical bearing seat 45 which is formed in a blind set screw 46. The blind set screw 46 is detachably inserted in an opening 47 formed in the bottom of the casing 20. The pin 39 has an indicating finger or rod 48 secured thereto and extending outwardly from the opposite side of the pin from the ball 38. The indicating finger 48 extends longitudinally through the interior of the casing 20 and has its outer end bent upwardly and transversely, forming an indicating point 49 which co-acts with the scale 50. The scale 50 is formed upon the outer end of the removable cover plate 51 of the casing 20 and it is graduated from zero outwardly, zero being placed equi-distant of the ends of the scale formed by the graduations, as is clearly shown in Fig. 1 of the drawings. The cover plate 51 is provided with an arcuate slot 52 through which the indicating point 49 of the finger 48 projects for movement above the scale 50.

A resilient wire 53 is coiled intermediate of its ends to form resilient convolutions 54 which extend around the pin 39 and it extends tangentially from the coils, having hooks 55 and 56 formed upon its ends. The hooks 55 and 56 are oppositely disposed and engage the finger 48 from different sides of the same, tending to hold the indicating point 49 at zero upon the scale 50 except when pressure is applied to the member 34, which causes variations in the position of the indicating finger, depending upon the amount of pressure administered to the member 34

The sleeve 31 is provided for detachably supporting various types of work engaging tips or nipples, a number of which are shown in Figs. 7, 8 and 9 of the drawings. In Fig. 7 and in Figs. 1 and 3, one type of work engaging nipple is illustrated which includes a body portion 60 which has a screw threaded split sleeve 61 formed thereon, for mounting upon the exterior of the sleeve 31. A lock nut or washer 62 is adjustably mounted upon the exterior of the sleeve 61 and has its outer surface roughened for facilitating the manual rotation of the same. The body 60 has its upper edge cut to form substantially a quarter of a circle, and the body is bifurcated, forming spaced arms 63 and 64, as illustrated in Fig. 3, between which is pivotally mounted a member 65, shaped to conform to the shape of the body 60 and having its inner edge straight and finished for engagement with the ball 36, as illustrated in Fig. 7, for operating the member 34 upon pivotal movement of the member 65. The member 65 has an outwardly extending pin 66 secured to the upper end of its outer surface, which pin has a ball 67 formed upon its outer end for engagement with the surface being worked upon. Uneven places or inaccuracies in the working surface will cause corresponding pivotal movement of the member 65, through the engagement of the ball 67 therewith, which will move the member 34 correspondingly with the movement of the member 65 and through the engagement of the balls 37 and 38 operate the finger 48 against the tension of the spring 53, for moving the indicating point 49 along the scale 50, indicating the scope of the inaccuracies in the working surface.

In Fig. 8 of the drawings, a different form of nipple is shown, which is particularly adaptable for properly centering the work upon a lathe. This nipple or tip includes a body 70, which is substantially an acorn shape, being provided with a centrally disposed longitudinally extending bore 71, which is enlarged, as is shown at 72. The bore of the body 70 is again enlarged at the outer or enlarged end of the body, forming a sleeve for mounting upon the outer surface of the sleeve 31. The sleeve 73, which is formed by the enlargement of the bore 71 is split, as is shown at 74 and it is externally screw threaded. A locking nut or washer 75 is adjustably mounted upon the outer surface of the sleeve 73 for moving the sections of the sleeve formed by the splitting of the same, closer together for securely clamping the nipple 70 upon the sleeve 31.

A pin 76 is mounted in the bore 71 and has a ball 77 formed upon its outer end which projects out of the apex of the body 70, and is provided for engagement with the surface of the work. A collar 78 is swaged or otherwise securely mounted upon the pin 76 and it is positioned within the enlargement 72. A removable washer 79 is mounted in the inner end of the bore of the sleeve 73, and is provided with an opening therein, through which the pin 76 extends. The washer 79 forms a partition which is engaged by the washer or collar 78 for limiting the inward movement of the pin 76. The pin 76 is positioned for engagement with the ball 36 for operating the member 34 for recording eccentrics in the mounting of the work upon a lathe, or inaccuracies in the working surface upon which such a nipple is adaptable for use.

The nipple or tip illustrated in Fig. 9 of the drawings includes a body 80 which is composed of sections 81 and 82 disposed at right angles to each other. The section 82 is provided with a bore 83 formed therein, which is provided for receiving the sleeve 31, and the portion of the section 82, which is provided with a bore 83 is split, as is shown at 84. A locking nut or washer 85 is adjustably mounted upon the outer surface of the bored section 82 for securely clamping it upon the sleeve 31. The section 82 has its upper corner cut away, forming an inclined side 86, which is positioned substantially at forty-five degrees to vertical sides of the section. The body of the section 82 above the bored portion thereof is split, for forming an opening 87 in which is seated the blade 88 of the member 89 which is operable under variations in the working surface of a piece of work. The blade 88 has a ball 90 swivelly connected thereto, which ball is positioned in the socket 91 formed in the section 81. The section 81 is provided with internal screw threads formed on a portion of its interior, which are provided for screw thread engagement with the external screw threads formed upon a rearwardly extending sleeve 92. The sleeve 92 is formed upon the body of the section 82. The section 81 is provided with an opening 93 formed in the upper surface thereof, which alines with a recess 94 formed in the ball 90. The recess 94 is provided for removably receiving a needle 95, which may have its outer end pointed, rounded, or perfectly flat, as desired, depending upon the type of work in connection with which this form of nipple or tip is used.

The opening 93 is of sufficient size as to permit of a limited amount of lateral movement of the needle 95, without operating the blade 88, and also to permit of the limited amount of oscillatory movement in a direction longitudinally of the blade 88 for operating the latter for indicating variations of work. The under edge 96 of the blade 88 is positioned for engagement with the knob or ball 36 when the body 80 is attached to the sleeve 31.

The cover 51 is removably attached to the body of the casing 20 by means of screws or analogous attaching means 97.

Variations in the working surface of articles will be registered by the movement of the finger 48, and the indicating point 49 thereof, in combination with the scale 50. The movement of the finger 48 will be occasioned by the operation of the various movable parts of the nipples or tips as heretofore described, which will operate the member 34, which in turn imparts the movement of the finger 48.

Fig. 12 shows the head of the gage, used for gaging a surface of a piece of work, and determining irregularities therein.

In Fig. 13, a modified form of the head is shown, which includes a head 100 identical in construction to the head or nipple 60, and a section of the pin which is attached thereto. The pin illustrated in Fig. 13, is composed of sections 101 and 102, which are disposed at right angles to each other. The pin 102 is provided for gaging the walls of an opening or recess, and it has a head 103 formed upon its outer end, which travels over the surface of the wall and will rock the member 104, upon the passage of the same over any irregularities in the surface.

In Fig. 14, still another modified form of the nipple or head of the gage is shown, which includes an attachment for the nipple 70. This modified form includes an angled finger or lever 110, which is detachably connected to the ball 77 which is mounted on the outer end of the pin 76. The angled finger 110 is pivotally connected to the ball 77, so that it may be inserted through the constricted mouth or opening of a piece of work which is illustrated in Fig. 14, and bent at substantially right angles to the pin 76 for gaging the inner wall or surface of the recess.

From the foregoing description taken in connection with the accompanying drawings the advantages of construction and of the method of operation of the improved surface gage will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a surface gage, a casing, a scale graduated upon said casing, an indicating finger carried by said casing for co-action with said scale, said indicating finger having one end secured to a pin, said pin being rotatably supported by said casing, a ball secured to and extending outwardly from said pin oppositely to the direction of extension of said indicating finger, means engaging said ball for rotating said pin for oscillating said finger, a resilient wire bent intermediate of its ends to form resilient convolutions, said convolutions coiled about said pin, oppositely disposed hooks formed upon the ends of said wire and engaging said indicating finger at different distances from said ball for holding said finger at a zero indicating position.

2. In a surface gage, a casing, a scale graduated upon said casing, an indicating finger carried by said casing for co-action with said scale, said indicating finger having one end secured to a pin, said pin being rotatably supported by said casing, a ball secured to and extending outwardly from said pin oppositely to the direction of extension of said indicating finger, a pin slidably carried by said casing, a ball mounted upon the inner end of said pin and engaging said first named ball, a ball formed upon the outer end of said pin, a resilient wire bent intermediate of its ends to form resilient convolutions, said convolutions coiled about said pin, oppositely disposed hooks formed upon the ends of said wire and engaging said indicating finger at different distances from said ball for holding said finger at a zero indicating position.

3. In a surface gage, a casing, a scale graduated upon said casing, an indicating finger carried by said casing for co-action with said scale, means for normally holding said finger at zero indicating position, said indicating finger having one end secured to a pin, said pin being rotatably supported by said casing, a ball secured to and extending outwardly from said pin oppositely to the direction of extension of said indicating finger, a pin slidably carried by said casing, a ball mounted upon the inner end of said pin and engaging said first named ball, a ball formed upon the outer end of said pin, a sleeve encompassing said last named pin, a nipple for detachably mounting upon said sleeve, said nipple carrying work surface engaging means for moving said pin for operating said indicating finger.

4. In a surface gage, a casing, a scale graduated upon said casing, an indicating finger carried by said casing for co-action with said scale, means for normally holding said finger at zero indicating position, said indicating finger having one end secured to a pin, said pin being rotatably supported by said casing, a ball secured to and extending outwardly from said pin oppositely to the direction of extension of said indicating finger, a pin slidably carried by said casing, a ball mounted upon the inner end of said pin and engaging said first named ball, a ball formed upon the outer end of said pin, a sleeve encompassing said last named pin, a nipple for detachably mounting upon said sleeve, a working surface engaging pin carried by said nipple, and means carried by said nipple and operable by said pin for moving said casing carried slidable pin.

5. In combination with a surface gage, a detachable nipple comprising a body portion, a split sleeve formed thereon to receive one end of the surface gage, a nut mounted on said sleeve for clamping said sleeve upon the surface gage, said body portion provided with its outer end tapered to form a substantially acorn formation, said body portion provided with a central bore terminating at its inner end in a bore of large dimension, a pin slidably mounted in said bore and engaging a working surface to operate the surface gage.

6. In combination with a surface gage, a detachable nipple comprising a body portion, a split sleeve formed thereon, to receive one end of the surface gage, a nut mounted on said sleeve for clamping said sleeve upon the surface gage, a second body portion secured to first mentioned body portion, said second mentioned body portion provided with a slit therein, a sleeve secured within said slit and adapted to engage a working surface, a ball swiveled to said sleeve, a pin secured to the ball and extending exteriorly of the casing for engagement with the working surface to operate the surface gage through the instrument of said blade.

7. A surface gage including a casing, a needle slidably mounted in the casing, a ball secured to the inner end of the needle, a pin journaled in said casing to one side of the ball, an indicating finger secured at one end of said pin, a second ball secured to said pin at one side of the finger and forming a crank engaged by said first ball.

In testimony whereof I affix my signature in presence of two witnesses.

LUDGER J. CARON.

Witnesses:
ARTHUR CARON,
HENRY I. CARON.

Copies of this patent may be obtained for five cents each, by addressing the "Commissioner of Patents, Washington, D. C."